(12) United States Patent
Lin

(10) Patent No.: US 7,679,901 B2
(45) Date of Patent: Mar. 16, 2010

(54) I/O DEVICE AND ELECTRONIC DEVICE HAVING THE SAME

(75) Inventor: Tsung-Te Lin, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 94 days.

(21) Appl. No.: 12/123,507

(22) Filed: May 20, 2008

(65) Prior Publication Data

US 2009/0174993 A1      Jul. 9, 2009

(30) Foreign Application Priority Data

Jan. 9, 2008    (TW) .............................. 97100785 A (51) Int. Cl.
*G06F 1/16*    (2006.01)

(52) U.S. Cl. .............................. 361/679.43; 361/679.4; 312/223.1; 312/223.2; 439/131

(58) Field of Classification Search ............. 361/679.4; 439/131, 446

See application file for complete search history.

(56) References Cited

U.S. PATENT DOCUMENTS

| | | | |
|---|---|---|---|
| 4,719,314 A * | 1/1988 | Nothnagel et al. | 174/481 |
| 4,743,999 A * | 5/1988 | Hames | 361/56 |
| 4,850,880 A * | 7/1989 | Zayat et al. | 439/11 |
| 4,959,021 A * | 9/1990 | Byrne | 439/310 |
| 5,499,932 A * | 3/1996 | Tanaka et al. | 439/446 |
| 5,624,167 A * | 4/1997 | Katz | 312/223.1 |
| 5,688,030 A * | 11/1997 | McAnally et al. | 312/223.2 |
| 5,735,707 A * | 4/1998 | O'Groske et al. | 439/446 |
| 6,116,958 A * | 9/2000 | Reichle | 439/640 |
| 6,208,506 B1 * | 3/2001 | Pao | 361/679.33 |
| 6,325,667 B2 * | 12/2001 | Sawayanagi | 439/537 |
| 6,385,042 B1 * | 5/2002 | Chen | 361/679.41 |
| 6,683,786 B2 * | 1/2004 | Yin et al. | 361/679.4 |
| 6,687,121 B1 * | 2/2004 | Chen | 361/679.4 |
| 7,066,767 B2 * | 6/2006 | Liao | 439/639 |
| 7,200,002 B2 * | 4/2007 | Peng et al. | 361/679.4 |
| 7,510,420 B2 * | 3/2009 | Mori | 439/446 |
| 7,540,748 B2 * | 6/2009 | Tracy et al. | 439/131 |
| 2005/0157454 A1 * | 7/2005 | Peng et al. | 361/679 |
| 2006/0002069 A1 * | 1/2006 | Chuang | 361/683 |

* cited by examiner

*Primary Examiner*—Jayprakash N Gandhi
*Assistant Examiner*—Anthony Q Edwards
(74) *Attorney, Agent, or Firm*—Thomas, Kayden, Horstemeyer & Risley (57) ABSTRACT

An electronic device is disclosed including a base having a first side on which a first opening is formed, a shaft disposed in the base, and an I/O port device having a plurality of I/O ports and a circuit board on which the I/O ports are disposed. The I/O port device is disposed in the base and rotates about the shaft, and the I/O ports are sequentially revealed by rotation of the I/O port device.

18 Claims, 8 Drawing Sheets

I/O DEVICE AND ELECTRONIC DEVICE HAVING THE SAME

BACKGROUND OF THE INVENTION

1. Field of the Invention

The invention relates to an electronic device with I/O ports, and in particular relates to an electronic device with a rotatable I/O port device on which I/O ports are disposed.

2. Description of the Related Art

Conventional laptops have I/O ports disposed on lateral sides. The lateral sides of conventional laptops have limited space, thus, it is not preferred to dispose I/O ports on the lateral sides of conventional laptops due to design considerations.

BRIEF SUMMARY OF INVENTION

An embodiment of an electronic device of the invention comprises a base having a first side on which a first opening is formed, a shaft disposed in the base, and an I/O port device having a plurality of I/O ports and a circuit board on which the I/O ports are disposed. The I/O port device is disposed in the base and rotates about the shaft, and the I/O ports are sequentially revealed by rotation of the I/O port device.

The I/O port device has a plurality of surfaces, and each surface has at least one I/O port, and one of the surfaces faces the first opening by the rotation of the I/O port device, whereby the I/O port on the surface is revealed via the first opening.

The I/O port device has three surfaces, and one of the surfaces faces the first opening by the rotation of the I/O port device, whereby the I/O port on the surface is revealed via the first opening.

The base further has a second side adjacent to the first side and a second opening, and the surfaces comprises a first surface and a second surface. The I/O port device rotates in such a manner that the first surface faces the first opening and the second surface faces the second opening, whereby the I/O ports on the first and second surfaces are respectively revealed via the first opening and the second opening.

The I/O port device has a first surface, a second surface, a third surface and a fourth surface, and the first surface is adjacent to the second and the fourth surfaces and opposite to the third surface. The I/O port device rotates in such a manner that the adjacent surfaces respectively face the first and second openings, whereby the I/O ports on the surfaces are respectively revealed via the first and second openings. The I/O port device has a main body and a positioning element fixed to the main body, and the shaft has a plurality of notches separated by equal distance, and when the positioning element engages one of the notches, the I/O port device is positioned on the shaft in such a manner that the adjacent surfaces face the first and second openings, whereby the I/O ports on the surfaces are respectively revealed via the first and second openings.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
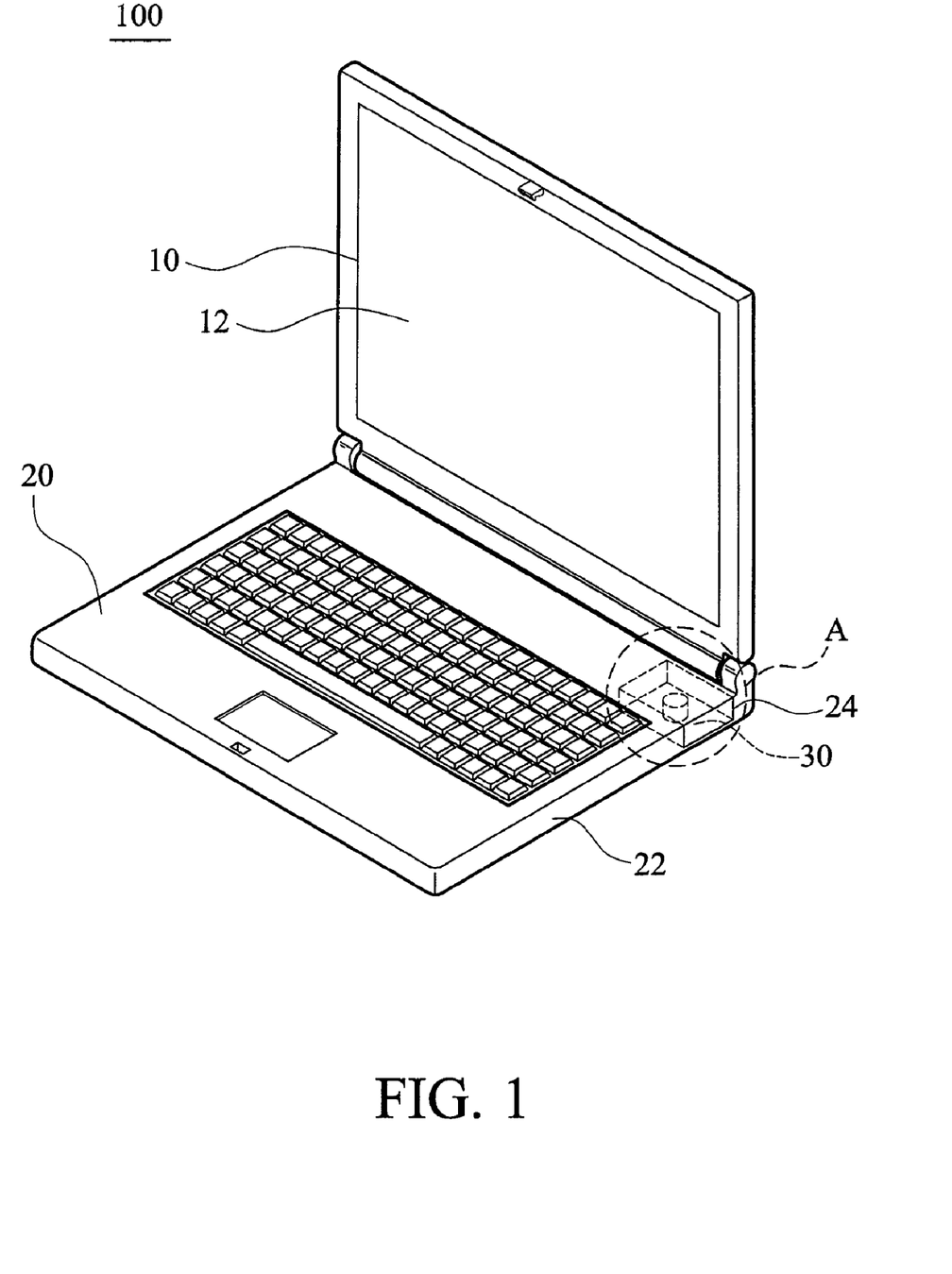
FIG. 1 is a schematic view of an embodiment of an electronic device of the invention.

FIG. 1 is a schematic view of an embodiment of an electronic device of the invention. In this embodiment, although a laptop is described as an example, the electronic device of the invention is not limited to a laptop.

Figure 2:
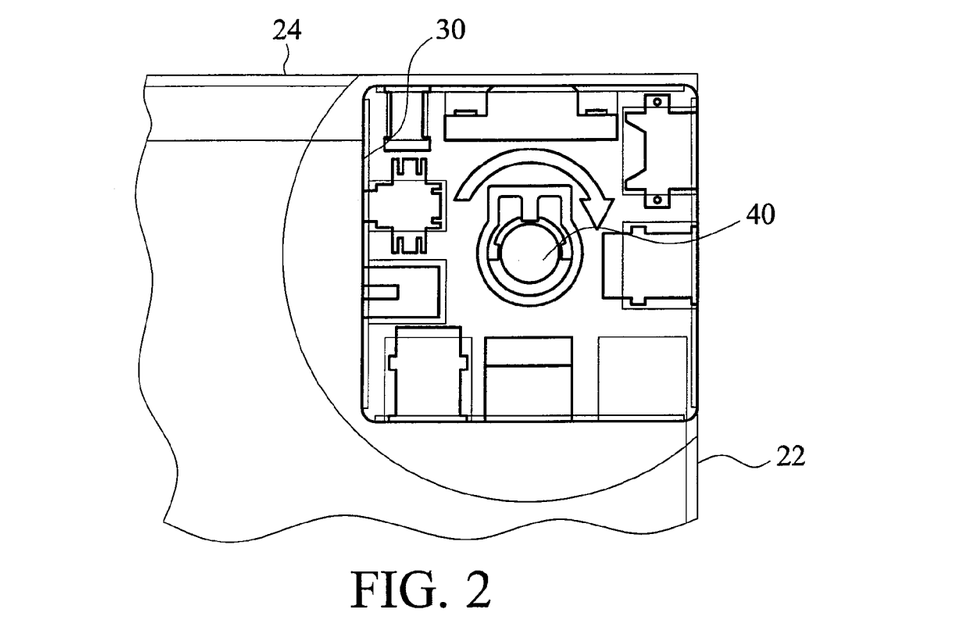
FIG. 2 is an enlarged view of portion A of FIG. 1.
Figure 3:
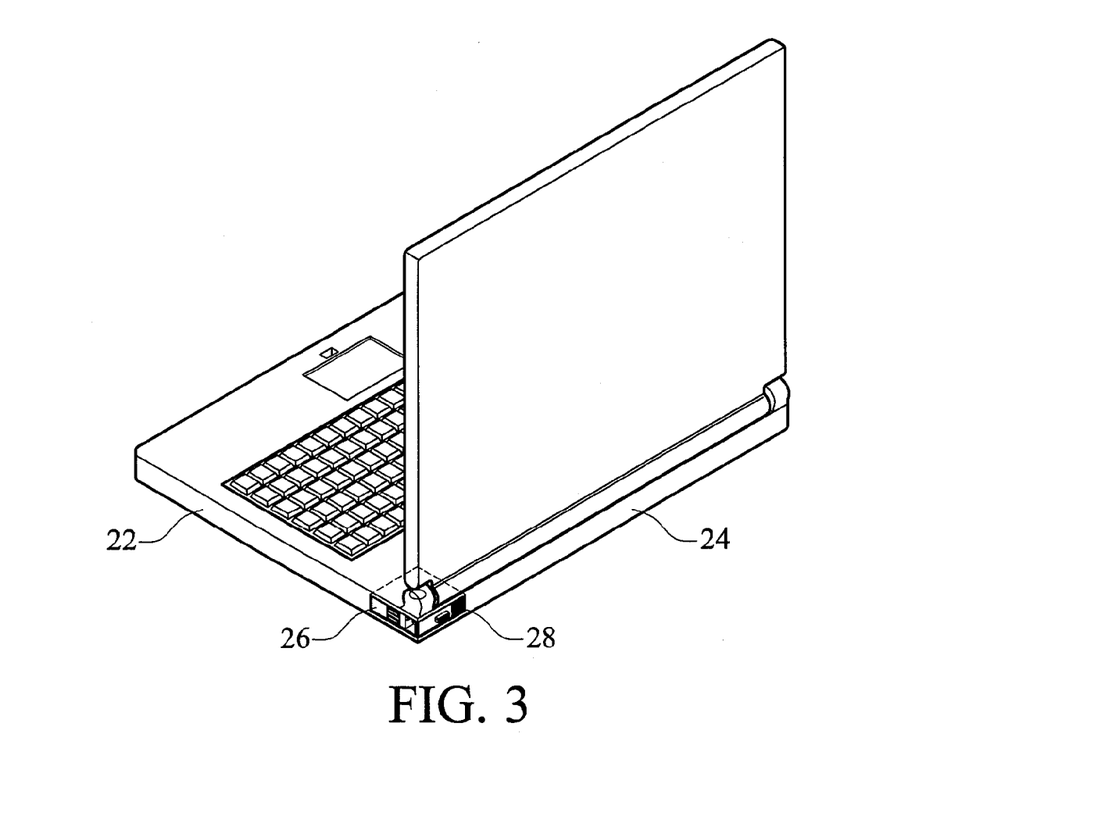
FIG. 3 is a perspective view of portion A of FIG. 1.

Referring to FIG. 1, a laptop 100 comprises a cover 10 and a base 20. A screen 12 is disposed on the inner side of the cover 10. The cover 10 is rotatably disposed on the base 20. The base 20 has a first side 22 and a second side 24 adjacent to the first side 22. An I/O port device 30 is disposed on the conjunction of the first side 22 and the second side 24. FIG. 2 is an enlarged view of portion A of FIG. 1. The I/O port device 30 rotates about a shaft 40. FIG. 3 is a perspective view of portion A of FIG. 1. A first opening 26 and a second opening 28 are formed on the first side 22 and the second side 24, respectively. The I/O ports on the I/O port device 30 are revealed via the first opening 26 and the second opening 28.

Figure 4:
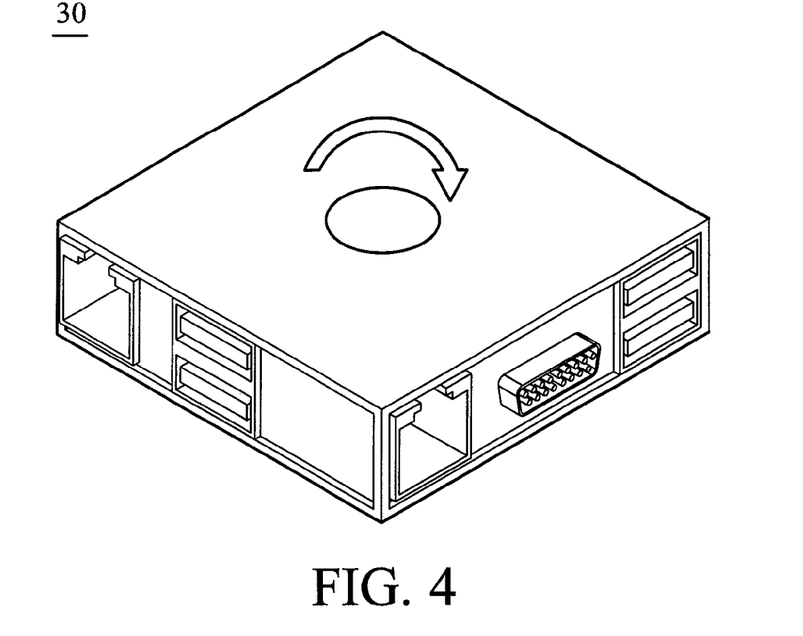
FIGS. 4 and 5 are perspective views of the I/O port device of the invention.
Figure 5:
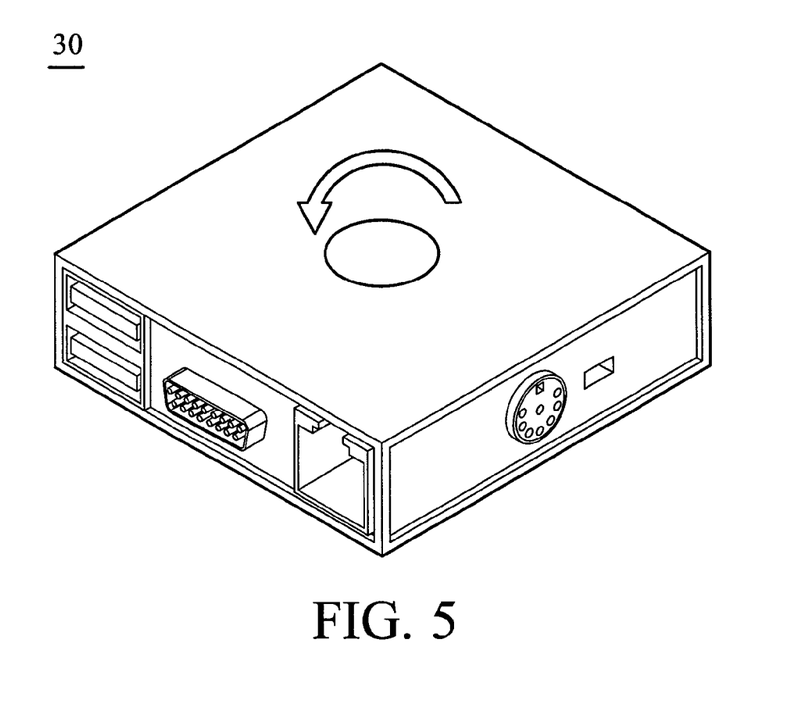
Figure 6:
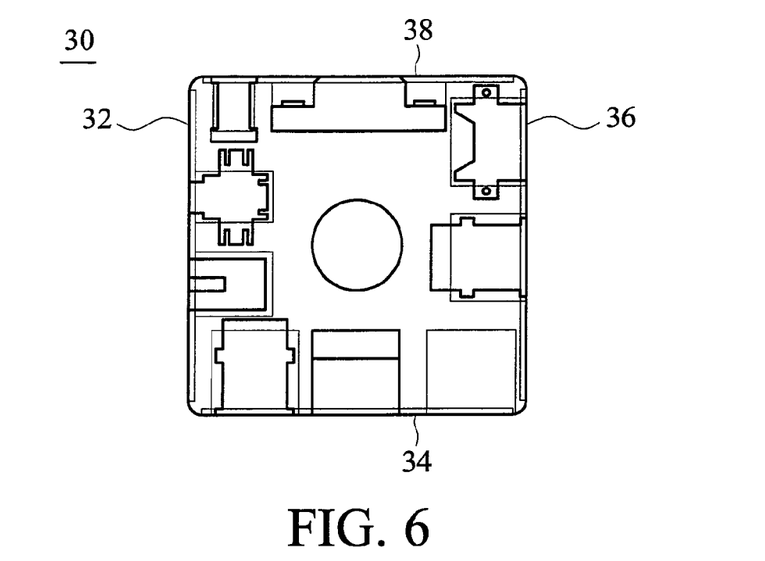
FIG. 6 is a cross section of the I/O port device of the invention.

Referring to FIGS. 4 and 5, the I/O port device 30 is rectangular and the I/O ports are disposed on four sides thereof. For example, see FIG. 6, a 1394 port and an S-Video port are disposed on a first side (first surface) 32, a USB port, an HDMI port and an RJ 45 port are disposed on the second side (second surface) 34, an RJ11 port and a USB port are disposed on the third side (third surface) 36, and a USB port and a CRT port are disposed on the fourth side (four surface) 38.

Figure 7:
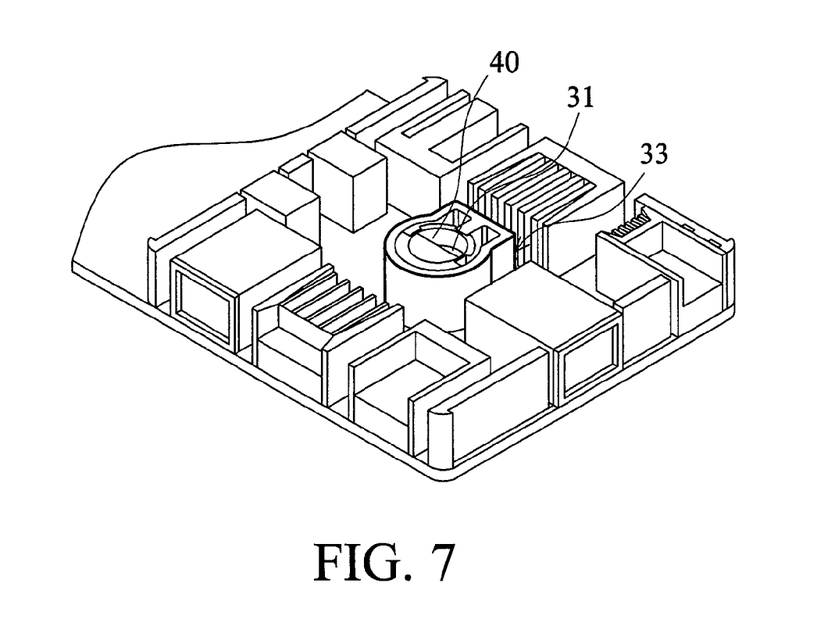
FIG. 7 is a schematic view of the positioning mechanism of the I/O port device of the invention.
Figure 8:
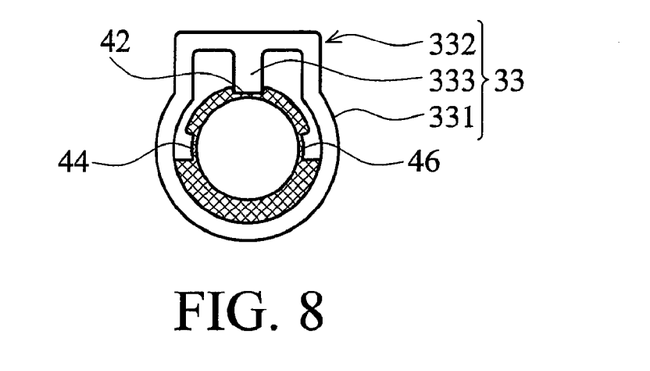
FIGS. 8 to 12 depict the movement of the positioning mechanism of the invention.
Figure 9:
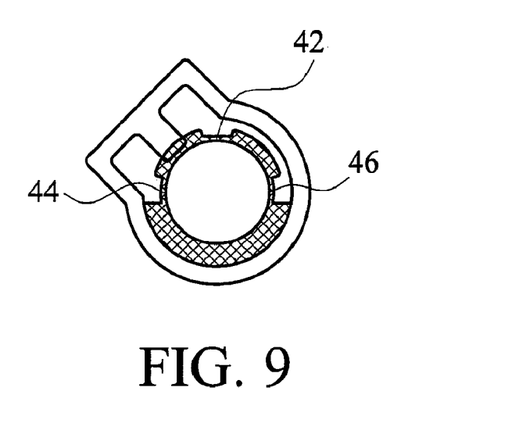
Figure 10:
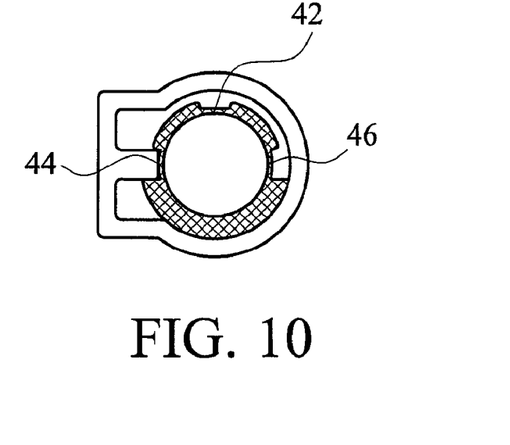
Figure 11:
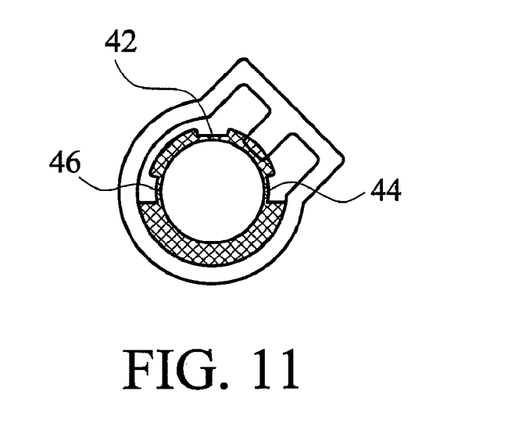
Figure 12:
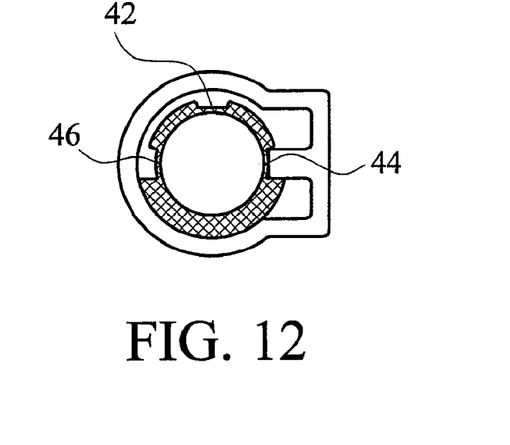

Referring to FIGS. 7 to 12, since the I/O ports on the I/O port device 30 must face the first opening 26 and the second opening 28 for convenient use, a positioning mechanism is needed. FIG. 7 depicts a positioning mechanism of the I/O port device 30. The I/O port device 30 comprises a hole 31 through which the shaft 40 extends. A positioning mechanism 33 is disposed around the hole 31. The positioning mechanism 33 comprises a ring 331 and an M-shaped element 332. The M-shaped element 332 has a finger (positioning element) 333, and three notches 42, 44 and 46 are formed on the periphery of the shaft 40. The finger 333 engages the notches to position the I/O port device 30. For example, when the finger 333 engages the notch 42, as shown in FIG. 8, the first side 32 and the second side 34 are revealed via the first opening 26 and the second opening 28, respectively. The M-shaped element 332 is elastic or the finger 333 is inclined so that the M-shaped element 332 rotates clockwise or counterclockwise about the shaft 40. When the I/O port device 30 rotates counterclockwise, the finger 333 escapes from the notch 42, as shown in FIG. 9, and enters the notch 44, as shown in FIG. 10. The fourth side 38 and the first side 32 of the I/O port device 30 face the first opening 26 and the second opening 28, respectively. When the I/O port device 30 rotates clockwise, the finger 333 escapes from the notch 42, as shown in FIG. 11, and enters the notch 46, as shown in FIG. 12. The second side 34 and the third side 36 face the first opening 26 and the second opening 28, respectively.

Figure 13:
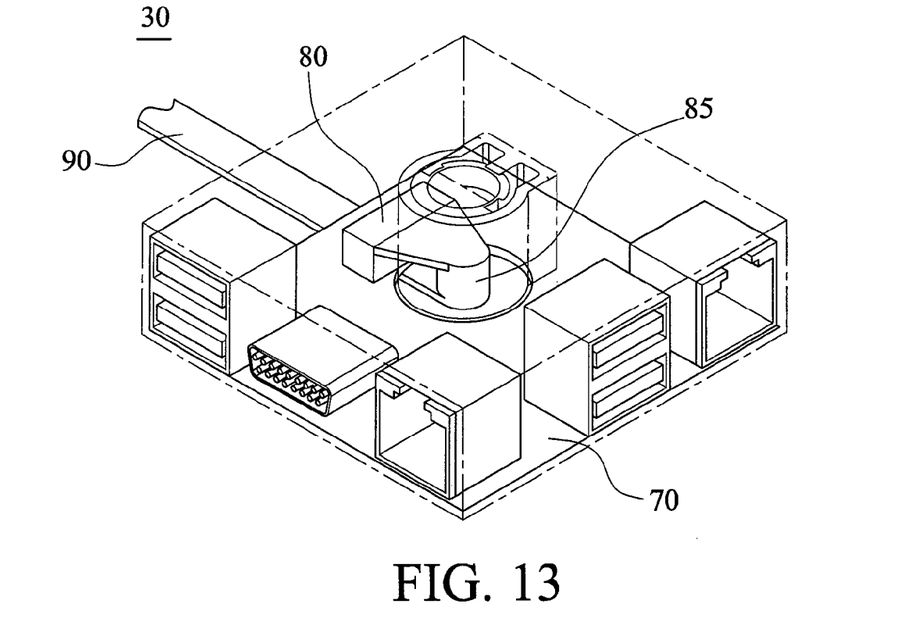
FIGS. 13 and 14 are perspective views of the cables of the I/O port device of the invention.
Figure 14:
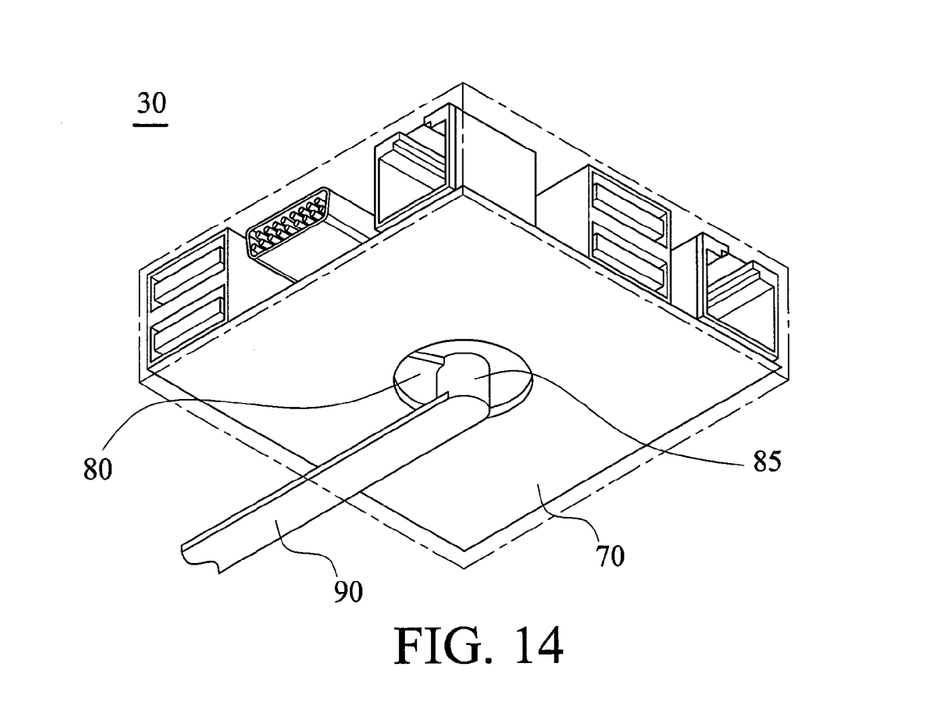
Figure 15:
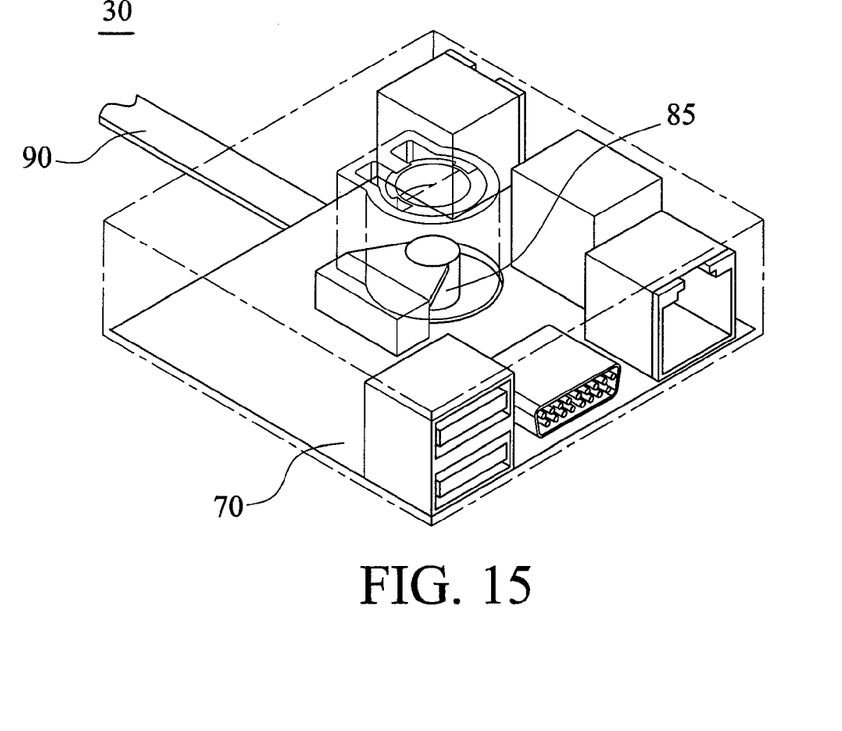
FIG. 15 depicts the I/O port device of FIG. 13 rotating counterclockwise 90°.
Figure 16:
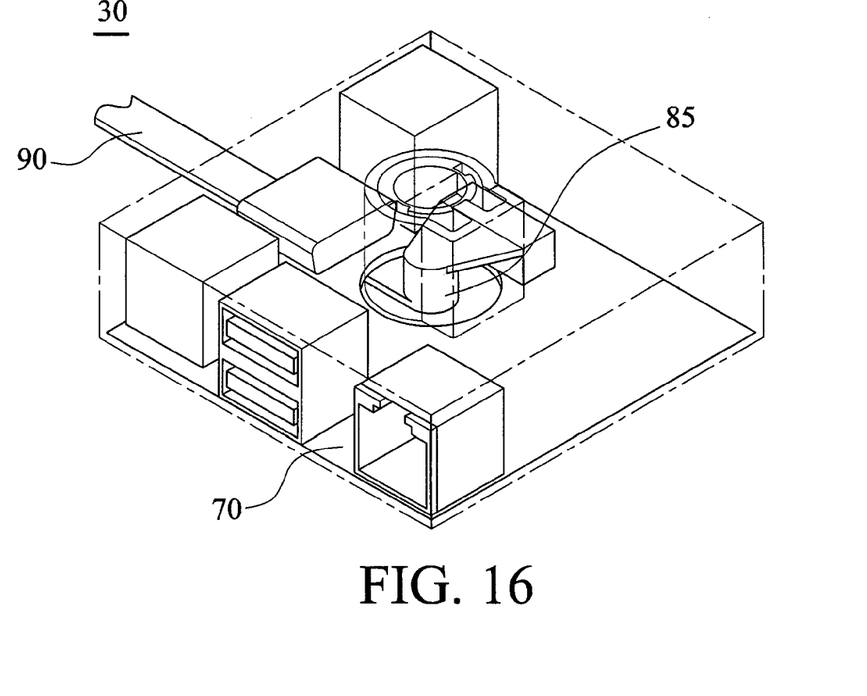
FIG. 16 depicts the I/O port device of FIG. 13 rotating clockwise 90°.

FIGS. 13 and 14 depict the cables of the I/O port device 30. FIG. 13 is a top view of the I/O port device 30, and FIG. 14 is the bottom view of the I/O port device 30. A circuit board 70 is disposed in the I/O port device 30, and a connecting portion 85 is disposed in the shaft 40. A cable portion 80 has one end electrically connected to the circuit board 70 and the other end connected to the connecting portion 85. The connecting portion 85 is connected to the base 20 via a cable 90. When the I/O port device 30 rotates, the cable portion 80 rotates. The space in the shaft 40 allows the cables of the cable portion 80 to rotate therein, as shown in FIGS. 15 and 16. FIG. 15 depicts the I/O port device of FIG. 13 rotating counterclockwise 90°. FIG. 16 depicts the I/O port device of FIG. 13 rotating clockwise 90°.

Figure 17:
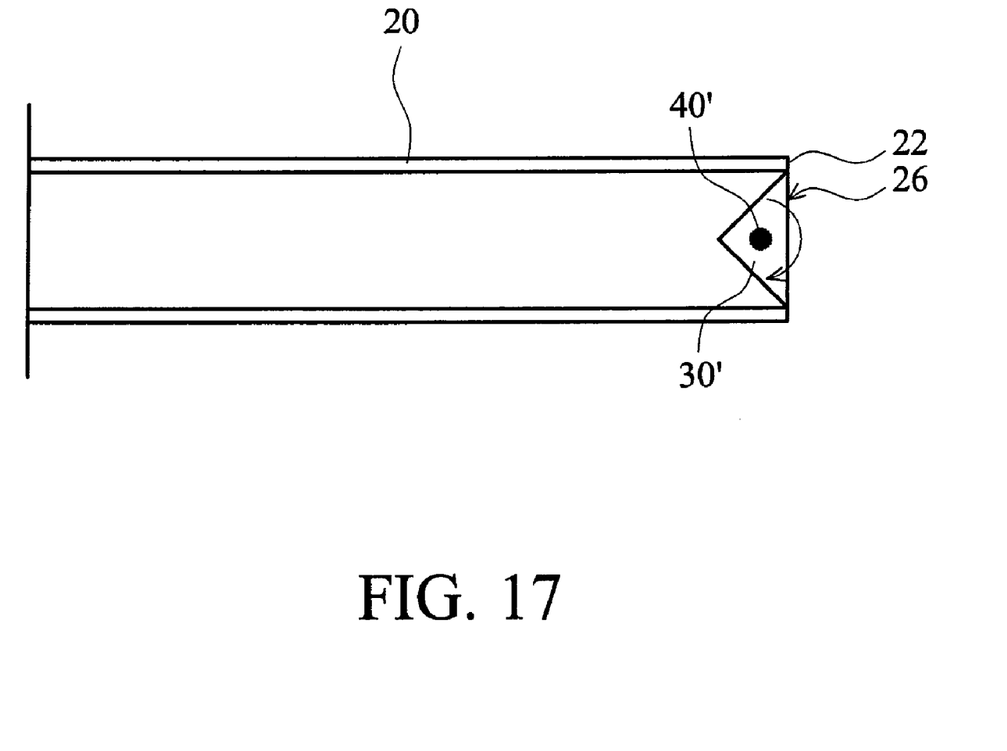
FIG. 17 is another embodiment of the I/O port device of the invention.

FIG. 17 depicts another embodiment of the I/O port device. In this embodiment, a shaft 40' is parallel to the first side 22. The I/O port device 30' is triangular and has three surfaces. Each surface has a plurality of I/O ports and are revealed via the first opening 26 by the rotation of the I/O port device 30'.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising
a base having a first side on which a first opening is formed;
a shaft disposed in the base and having a plurality of notches separated by equal distance; and
an I/O port device having a main body, a positioning element fixed to the main body, a plurality of I/O ports and a circuit board, on which the I/O ports are disposed, disposed in the main body, wherein the I/O port device is disposed in the base and rotates about the shaft, and the I/O ports are sequentially revealed by rotation of the I/O port device, and when the positioning element engages one of the notches, the I/O port device is positioned on the shaft in such a manner that the I/O ports are revealed via the first opening.

2. The electronic device as claimed in claim 1, wherein the I/O port device has a plurality of surfaces, and each surface has at least one I/O port, and one of the surfaces faces the first opening by the rotation of the I/O port device, whereby the I/O port is revealed via the first opening.

3. The electronic device as claimed in claim 2, wherein the I/O port device has three surfaces, and one of the surfaces faces the first opening by the rotation of the I/O port device, whereby the I/O port on the surface is revealed via the first opening.

4. The electronic device as claimed in claim 2, wherein the base further has a second side adjacent to the first side and a second opening, and the surfaces comprises a first surface and a second surface, wherein the first surface faces the first opening and the second surface faces the second opening by rotation of the I/O port device and the I/O ports on the first and second surfaces are respectively revealed via the first opening and the second opening.

5. The electronic device as claimed in claim 2, wherein the base further has a second side adjacent to the first side and a second opening formed on the second side and the I/O port device has a first surface, a second surface, a third surface and a fourth surface, and the first surface is adjacent to the second and the fourth surfaces and opposite to the third surface, wherein the adjacent surfaces face the first and second openings by the rotation of the I/O port device, and the I/O ports on the surfaces are respectively revealed via the first and second openings.

6. The electronic device as claimed in claim 5, wherein the I/O port device has a main body and a positioning element fixed to the main body, and the shaft has a plurality of notches separated by equal distance, and when the positioning element engages one of the notches, the I/O port device is positioned on the shaft in such a manner that the adjacent surfaces face the first and second openings, whereby the I/O ports on the surfaces are respectively revealed via the first and second openings.

7. The electronic device as claimed in claim 6, wherein the positioning element comprises an M-shape element, a finger and a ring, wherein the finger is engaged one of the notches.

8. The electronic device as claimed in claim 1, wherein the positioning element comprises an M-shape element, a finger and a ring, wherein the finger is engaged one of the notches.

9. The electronic device as claimed in claim 8 further comprising a cable portion and a connecting portion, wherein the cable portion has one end electrically connected to the circuit board and the other end rotatably connected to the connecting portion, and the connecting portion is disposed in the shaft and connected to the base via a cable.

10. An I/O port device for an electronic device comprising a base having a first side on which a first opening is formed, comprising:
a shaft disposed in the base and having a plurality of notches separated by equal distance;
a main body;
a positioning element fixed to the main body
a circuit board disposed in the main body; and
a plurality of I/O ports disposed on the circuit board, wherein the I/O port device rotates about the shaft in such a manner that the I/O ports are sequentially revealed by rotation of the I/O port device, and when the positioning element engages one of the notches, the I/O port device is positioned on the shaft in such a manner that the I/O ports are revealed via the first opening.

11. The I/O port device as claimed in claim 10, wherein the I/O port device has a plurality of surfaces, and each surface has at least one I/O port, and one of the surfaces faces the first opening by the rotation of the I/O port device, whereby the I/O port on the surface is revealed via the first opening.

12. The I/O port device as claimed in claim 11, wherein the I/O port device has three surfaces, and one of the surfaces faces the first opening by the rotation of the I/O port device, whereby the I/O port on the surface is revealed via the first opening.

13. The I/O port device as claimed in claim 11, wherein the base further has a second side adjacent to the first side and a second opening, and the surfaces comprises a first surface and a second surface, wherein the first surface faces the first opening and the second surface faces the second opening by the rotation of the I/O port device and the I/O ports on the first and second surfaces are respectively revealed via the first opening and the second opening.

14. The I/O port device as claimed in claim 11, wherein the base further has a second side adjacent to the first side and a second opening formed on the second side and the I/O port device has a first surface, a second surface, a third surface and a fourth surface, and the first surface is adjacent to the second and the fourth surfaces and opposite to the third surface, wherein the adjacent surfaces face the first and second openings by the rotation of the I/O port device and the I/O ports on the surfaces are respectively revealed via the first and second openings.

15. The I/O port device as claimed in claim 14, wherein the I/O port device has a main body and a positioning element fixed to the main body, and the shaft has a plurality of notches separated by equal distance, and when the positioning element engages one of the notches, the I/O port device is positioned on the shaft in such a manner that the adjacent surfaces face the first and second openings, whereby the I/O ports on the surfaces are respectively revealed via the first and second openings.

16. The I/O port device as claimed in claim 15, wherein the positioning element comprises an M-shape element, a finger and a ring, wherein the finger is engaged one of the notches.

17. The I/O port device as claimed in claim 10, wherein the positioning element comprises an M-shape element, a finger and a ring, wherein the finger is engaged one of the notches.

18. The I/O port device as claimed in claim 17 further comprising a cable portion and a connecting portion, wherein the cable portion has one end electrically connected to the circuit board and the other end rotatably connected to the connecting portion, and the connecting portion is disposed in the shaft and connected to the base via a cable.

* * * * *